Dec. 15, 1942.         K. DICKSON         2,304,893
NUMBER BOARD
Filed Oct. 21, 1940
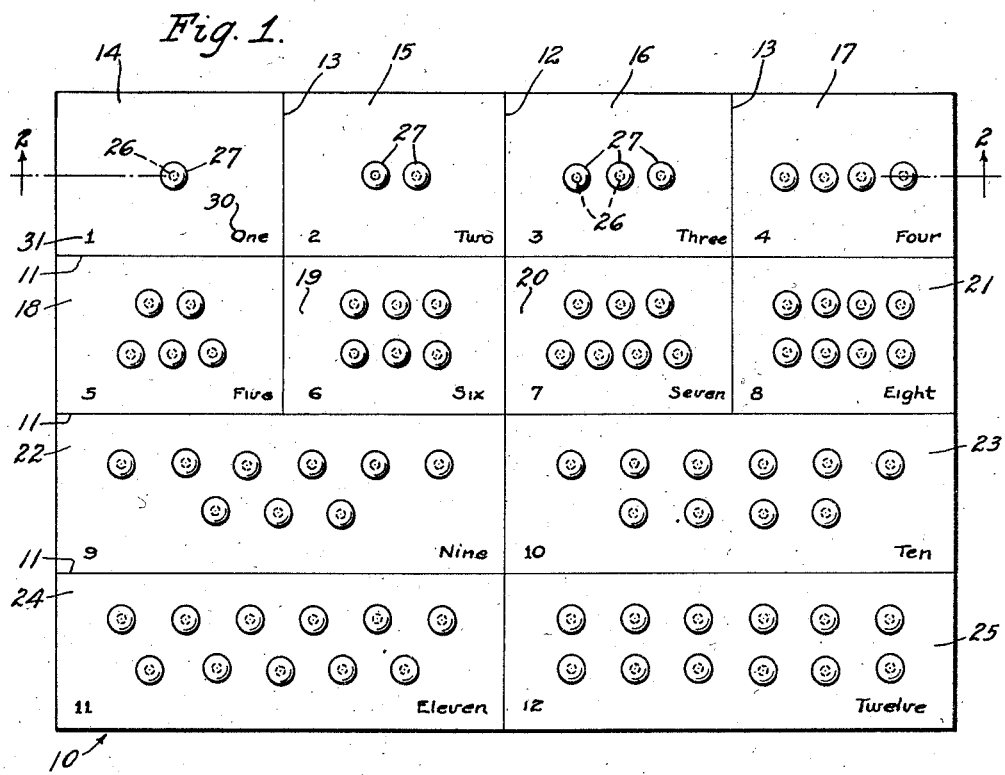
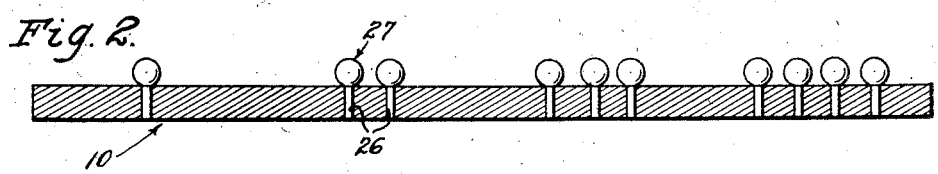
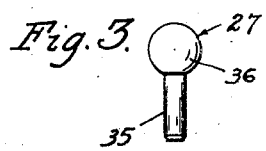
INVENTOR.
Katharine Dickson
BY
Robt. W. Pearson
ATTORNEY Patented Dec. 15, 1942

2,304,893

UNITED STATES PATENT OFFICE 2,304,893

NUMBER BOARD

Katharine Dickson, Pasadena, Calif.

Application October 21, 1940, Serial No. 362,073

3 Claims. (Cl. 35—31)

This invention relates to a number board intended to be used for educational purposes.

Among the objects of the invention are: To provide an attractive, improved, multi-colored means for teaching young children to count and to develop their perception of numbers; and to provide a means for more advantageously teaching children to read number indications, whether expressed in numerals or in letters; to furnish a superior means for teaching children addition and subtraction of whole numbers. Still another object of the invention is to provide, in conjunction with a board having seats for them, improved number indicating pegs, each peg having a head of a kind which facilitates grasping the peg and which affords a superior means for color designation of the peg.

Other objects, advantages and features of invention will hereinafter appear.

Referring to the accompanying drawing, which illustrates what is at present deemed to be a preferred embodiment of the invention, Fig. 1 is a plan view of the complete device.

Fig. 2 is a cross section on line 2—2 of Fig. 1.

Fig. 3 is a side elevation of one of the pegs separately shown.

Referring in detail to the drawing, a rectangular mounting board 10 is provided, which may consist of hard wood laminated in order to prevent warping. Said board may be variously shaped without departing from the spirit of the claimed invention, but is shown as rectangular and of a length about fifty per cent greater than its width.

The face of said board is marked off into rectangular areas by means of the longitudinal, equally spaced lines 11, a mid cross line 12 and two shorter cross lines 13, the latter two lines extending only from one long edge of the board to the longitudinal line 11 along its mid width. Each of said lines extends parallel to an end or side edge of the board, and these lines intersect as shown, thus marking off upon the board rectangular areas which border upon each other.

Viewing the board as shown in Fig. 1, and beginning with its upper left hand corner, the areas of the first row are consecutively numbered 14, 15, 16 and 17, and those of the next row are likewise numbered 18, 19, 20 and 21. On the lower half of the board are the areas 22, 23, 24 and 25.

The board is provided with a multiplicity of seats 26 to receive removable pegs 27 each of which has a globular head. The various seats 26 may be formed as holes extending completely through the board or may extend into the board from its front face to any desired depth. A group of these holes is, by preference and as shown, symmetrically arranged within each of the various rectangular areas which have been mentioned except the first, which has only one hole. A single peg is shown in the center of the first area 14, two pegs in the area 15, three in the area 16, and four in the area 17. Likewise in the next row, beginning with the area 18, five holes are shown, and the holes number one higher in each successive area throughout the areas 19, 20, 21, 22, 23, 24 and 25. Upon each of the rectangular areas is inscribed an indication, both by means of a written word 30 and by means of a numeral 31, designating the number of holes in that particular rectangular area.

In order to add to the attractiveness of the device, and as an aid to keeping in mind the number of pegs in the various groups, the pegs of each group are differently colored from those of the adjacent groups.

In Fig. 3 is detailed one of the pegs 27, said peg being shown as consisting of a cylindrical shank portion 35 and a globular head 36. The shank is shown projecting below the head a less distance than the thickness of the mounting board, allowing the lower side of the head to rest upon the upper surface of the board. The globular heads of the pegs render them more noticeable than pegs of the headless type, and also afford a more convenient means for grasping them. The different colors used would soon wear off from ordinary pegs, and using the globular heads not only prevents rapid wearing away of the colored paint used but makes the difference in the colors of the pegs much more noticeable.

I claim:

1. In a device of the character described, a board, a plurality of movable markers, the board being provided with a plurality of easily distinguishable groups of sockets for holding said markers, each of said sockets being formed to hold only a single marker; the groups being made up of different numbers of sockets and being individually marked with numerical designations corresponding to the number of sockets in the associated group, the markers being transferable from the sockets of one group to the sockets of the other groups and being accommodated in any one group only to the extent of the number of sockets in that group.

2. In a device of the character described, a board having markings dividing it into separate and adjacent areas, the areas being individually marked with numerical designations which increase in value progressively from area to area, markers which are transferable from area to area, holding means in said areas and comprised exclusively of sockets adapted to receive said markers, each socket accommodating only one marker, the sockets in each area corresponding in number to the numerical designation of that area and, with one marker to a socket, exactly accommodating the number of markers which correspond to the numerical designation of that area.

3. In a device of the character described, a board having markings dividing it into separate and adjacent areas, the areas being individually marked with numerical designations which increase in value progressively from area to area, markers which are transferable from area to area, holding means in said areas and comprised exclusively of sockets adapted to receive said markers, each socket accommodating only one marker, the sockets in each area corresponding in number to the numerical designation of that area and, with one marker to a socket, exactly accommodating the number of markers which correspond to the numerical designation of that area, said markers being shaped to prevent one from being piled on another over any one socket.

KATHARINE DICKSON.